(12) United States Patent
Nielsen et al.

(10) Patent No.: US 8,332,746 B2
(45) Date of Patent: Dec. 11, 2012

(54) TRANSFORMATION OF PHYSICAL AND LOGICAL LAYOUT FORMS TO LOGICAL LAYOUT PAGES

(75) Inventors: Anders Nielsen, Copenhagen (DK); Elly O. Nkya, Lyngby (DK); Henrik Nielsen, Lyngby (DK); Dymtro Kryshtalov, Charlottenlund (DK); Jesper Kiehn, Copenhagen (DK); Olga T. Mulvad, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 12/147,434

(22) Filed: Jun. 26, 2008

(65) Prior Publication Data
US 2009/0327867 A1 Dec. 31, 2009

(51) Int. Cl.
*G06F 17/00* (2006.01)
(52) U.S. Cl. ......... 715/239; 715/234; 715/236; 715/243
(58) Field of Classification Search .................. 715/234, 715/236, 238, 239, 243, 249, 255
See application file for complete search history.

(56) References Cited

U.S. PATENT DOCUMENTS

| | | | | |
|---|---|---|---|---|
| 6,006,242 | A * | 12/1999 | Poole et al. ............... | 715/209 |
| 6,854,120 | B1 * | 2/2005 | Lo et al. .................. | 719/311 |
| 6,996,781 | B1 * | 2/2006 | Myers et al. .............. | 715/763 |
| 7,168,045 | B2 | 1/2007 | Fliess et al. | |
| 7,184,165 | B2 * | 2/2007 | Mori et al. ............... | 358/1.15 |
| 7,313,757 | B2 * | 12/2007 | Bradley et al. .......... | 715/222 |
| 7,581,177 | B1 * | 8/2009 | Mollicone et al. ....... | 715/243 |
| 7,904,801 | B2 * | 3/2011 | Catorcini et al. ......... | 715/223 |
| 7,913,159 | B2 * | 3/2011 | Larcheveque et al. .... | 715/224 |
| 2005/0114765 | A1 | 5/2005 | Gudenkauf et al. | |
| 2006/0007466 | A1 | 1/2006 | Ben-Yehuda et al. | |
| 2006/0031759 | A1 | 2/2006 | Brown et al. | |
| 2006/0206589 | A1 | 9/2006 | Lentini et al. | |
| 2006/0235984 | A1 | 10/2006 | Kraus et al. | |
| 2006/0259458 | A1 * | 11/2006 | Hunter et al. ............ | 707/2 |
| 2007/0055924 | A1 | 3/2007 | Farr et al. | |
| 2007/0220039 | A1 | 9/2007 | Waldman et al. | |
| 2007/0239653 | A1 | 10/2007 | Kiehn | |
| 2007/0266151 | A1 | 11/2007 | Friedland et al. | |

OTHER PUBLICATIONS

"Developing Solutions for Microsoft Dynamic NAV," Nov. 2007, http://dynamicsuser.net/files/folders/95574/download.aspx [last accessed Nov. 10, 2008].
Lin, Yi-Jung et al., "Role-Based and Adaptive User Interface Designs in a Teledermatology Consult System: a Way to Secure and a Way to Enhance," AMIA Annual Symp. Proc. 2003, http://www.pubmedcentral.nih.gov/articlerender.fcgi?artid=1480225 [last accessed Nov. 10, 2008].
"Microsoft Dynamics NAV," http://en.wikipedia.org/wiki/Microsoft_Dynamics_NAV [last accessed Nov. 10, 2008]. "Recommendations when Implementing Microsoft Dynamic NAV 5.0," Aug. 2007, http://download.microsoft.com/download/b/7/a/b7aff0b7-b1d4-4367-9740-21e49c673b27/nav5.0_recommendations_when_implementing_dynamics_en.PDF [last accessed Nov. 10, 2008].

* cited by examiner

*Primary Examiner* — Thu Huynh
(74) *Attorney, Agent, or Firm* — Perkins Coie LLP

(57) ABSTRACT

A method and system for transforming customer-developed forms that may define the physical layout of a user interface to pages that define the logical layout of the user interface is provided. A transformation system transforms forms specifying both a logical and a physical layout of a user interface for a forms version of an application to pages specifying only the logical layout of the user interface for a pages version of the application. A customer may customize code rules and configuration data that is used by the transformation system to transform the forms of the customer to pages.

20 Claims, 6 Drawing Sheets

TRANSFORMATION OF PHYSICAL AND LOGICAL LAYOUT FORMS TO LOGICAL LAYOUT PAGES

BACKGROUND

Enterprise Resource Planning ("ERP") refers to the field of integrating most of the data and processes of an organization into a unified system. A typical ERP system uses multiple components of computer software and hardware to achieve the integration. Most ERP systems use a unified database to store data for the various system components. Prior to using an ERP system, most organizations have separate applications for accounting, human resources, and other business functions, with external interfaces between each application for sharing data between applications. The introduction of an ERP system to replace two or more independent applications eliminates the need for external interfaces previously required between these applications and provides additional benefits that range from standardization and lower maintenance (one system instead of two or more) to easier reporting and greater reporting capabilities (as all data is typically kept in one database). ERP systems typically attempt to cover all basic functions of an organization, regardless of the organization's business or charter. For example, ERP systems may cover manufacturing, warehousing, logistics, information technology, accounting, human resources, marketing, payroll, and strategic management. Businesses, nonprofit organizations, nongovernmental organizations, governments, and other organizations utilize ERP systems.

Business systems, such as ERP systems and customer relationship management ("CRM") systems, typically provide a development environment in which custom programs can be developed that interface with the business system of an organization to provide specialized functionality or business logic needed by the organization. These custom programs can be developed by the provider of the business system, the organizations that use the business system, or third-party developers who provide business solutions for organizations. To facilitate the development of such custom programs, the business systems typically provide a development environment that may include a specialized programming language and tools for developing forms for defining the user interface for the custom programs.

Typical forms development tools allow forms to be developed that define both the logical and the physical layout. For example, a developer may specify that a user interface is to have six forms that are selected using tabs without specifying how the tabs are to be presented. A forms development tool then determines how the tabs are to be physically laid out. Thus, the developer specifies the logical layout (e.g., six forms with tabs), and the forms development tool specifies the physical layout of the tabs. The forms development tools may also allow the developer to specify the physical layout of a form. For example, a developer may specify that a certain text box of a form is to be located at a certain location (e.g., x and y coordinates) within the form.

The development of forms that define both logical and physical layout presents problems when the forms are to be displayed on display devices with different sizes and aspect ratios than the originally targeted display device. For example, an organization that has developed custom forms originally targeted for desktop computers may want to allow its employees to access the custom form via devices that support only small displays (e.g., personal digital assistants and cellular phones). Because the custom forms may define physical layout characteristics, the forms may not display properly on such small displays.

SUMMARY

A method and system for transforming customer-developed forms that may define the physical layout of a user interface to pages that define the logical layout of the user interface is provided. A transformation system transforms forms specifying both a logical and a physical layout of a user interface for a forms version of an application to pages specifying only the logical layout of the user interface for a pages version of the application. A customer may customize code rules and configuration data that is used by the transformation system to transform the forms of the customer to pages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 illustrates a user interface of a forms version of an application that uses forms.

FIG. 2 illustrates a user interface of a pages version of an application that uses pages.

DETAILED DESCRIPTION

Figure 3:
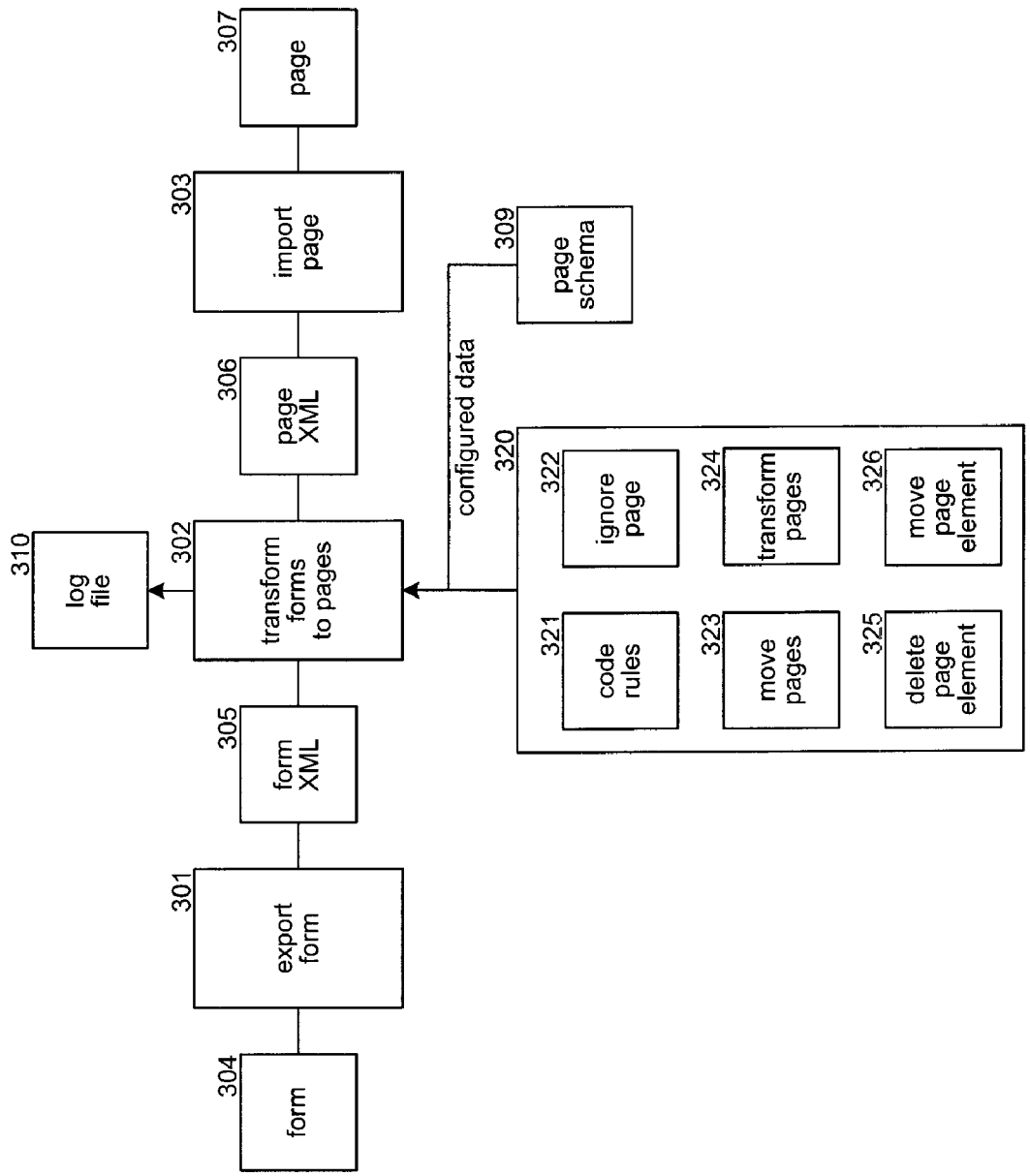
FIG. 3 is a block diagram that illustrates components of the transformation system in some embodiments.

A method and system for transforming customer-developed forms that may define the physical layout of a user interface to pages that define the logical layout of the user interface is provided. In some embodiments, a transformation system transforms forms specifying both a logical and a physical layout of a user interface for a first version of an application (e.g., ERP system) to pages specifying only the logical layout of the user interface for second version of the application. Because an organization may have developed hundreds of forms for the first version of the application, it can be very time-consuming to manually convert the forms to the pages for the second version of the application. The transformation system automates at least a portion of this conversion process.

The transformation system may initially export the forms in the internal format of the first or forms version of the application to an external file with an external format. The external format of a form may be an extensible Markup Language ("XML") format that complies with a forms XML schema (see Table 1) that allows the features of the forms to be specified. For example, the XML schema for a form may allow properties, triggers, controls, and code for a form to be specified. The transformation system also provides code rules and control inputs to help guide the transformation of forms to pages. The code rules specify how to transform code of the forms to corresponding code of pages. For example, a form may specify that code implementing a tool tip is to be executed when the mouse pointer hovers over a certain field on the form. The second or pages version of the application, however, may include automatic support for providing such tool tips on pages. In such a case, a code rule may specify how to change "hover" triggers of forms to their corresponding functionality for a page. The control inputs may specify what forms, elements, controls, and other aspects of a form are to be transformed. For example, an organization may only want to transform certain forms to pages or specify that certain elements need to be transformed in a certain way. In general, an organization can modify the code rules and control inputs to tailor the transformation to its specific forms and desired pages.

The transformation system transforms the external file representing pages to an external file representing forms by applying code rules to replace code patterns within the forms with replacement code for a page and modifying the forms in accordance with the control inputs. The external format of a page complies with pages XML schema (Table 2) defined for pages. When the transformation process is complete, the external file represents the pages corresponding to the forms. The transformation system can then import the external file representing the pages into the internal format of the pages version of the application. The pages version of the application program can then present the user interface as defined by the imported pages. Because the pages specify only the logical layout of the user interface, the pages version of the application can more easily adapt the user interface to display devices with a variety of sizes and aspect ratios.

Figure 1:
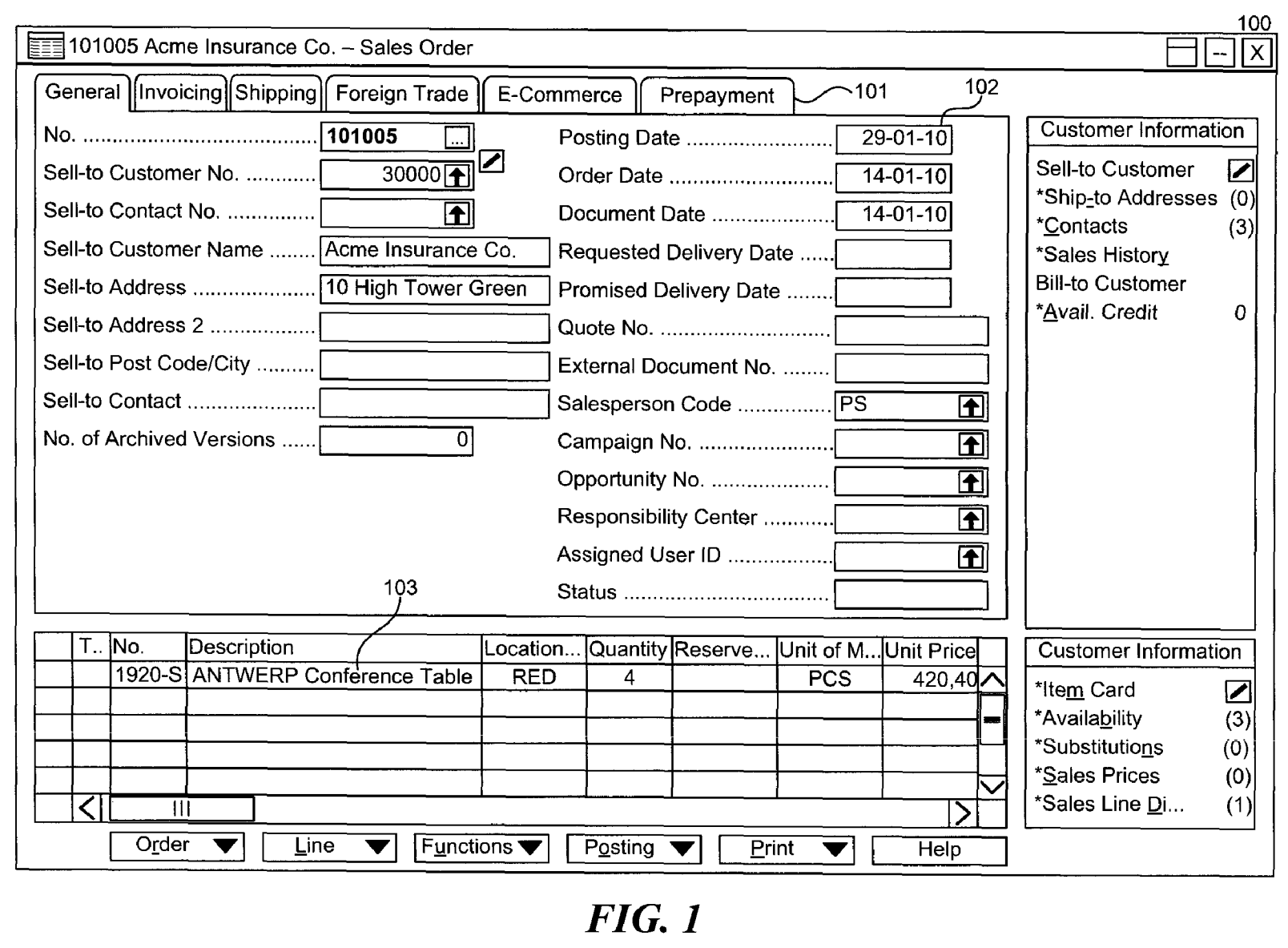

FIG. 1 illustrates a user interface of a forms version of an application that uses forms. The user interface 100 is a sales order user interface that includes a tabs area 101, fields 102, and a sub-form 103. The tabs are used to select the different forms of the user interface (e.g., general and shipping). The fields are various controls (e.g., text boxes) that are used to input and output information of a form. The sub-form allows line items of the sales order to be specified. When developing this form-based user interface, the developer may have specified the physical location of each field and the physical location of the sub-form. For example, the developer may have specified that the "Posting Date" and the "Order Date" fields are at the top on the second column of fields.

Figure 2:
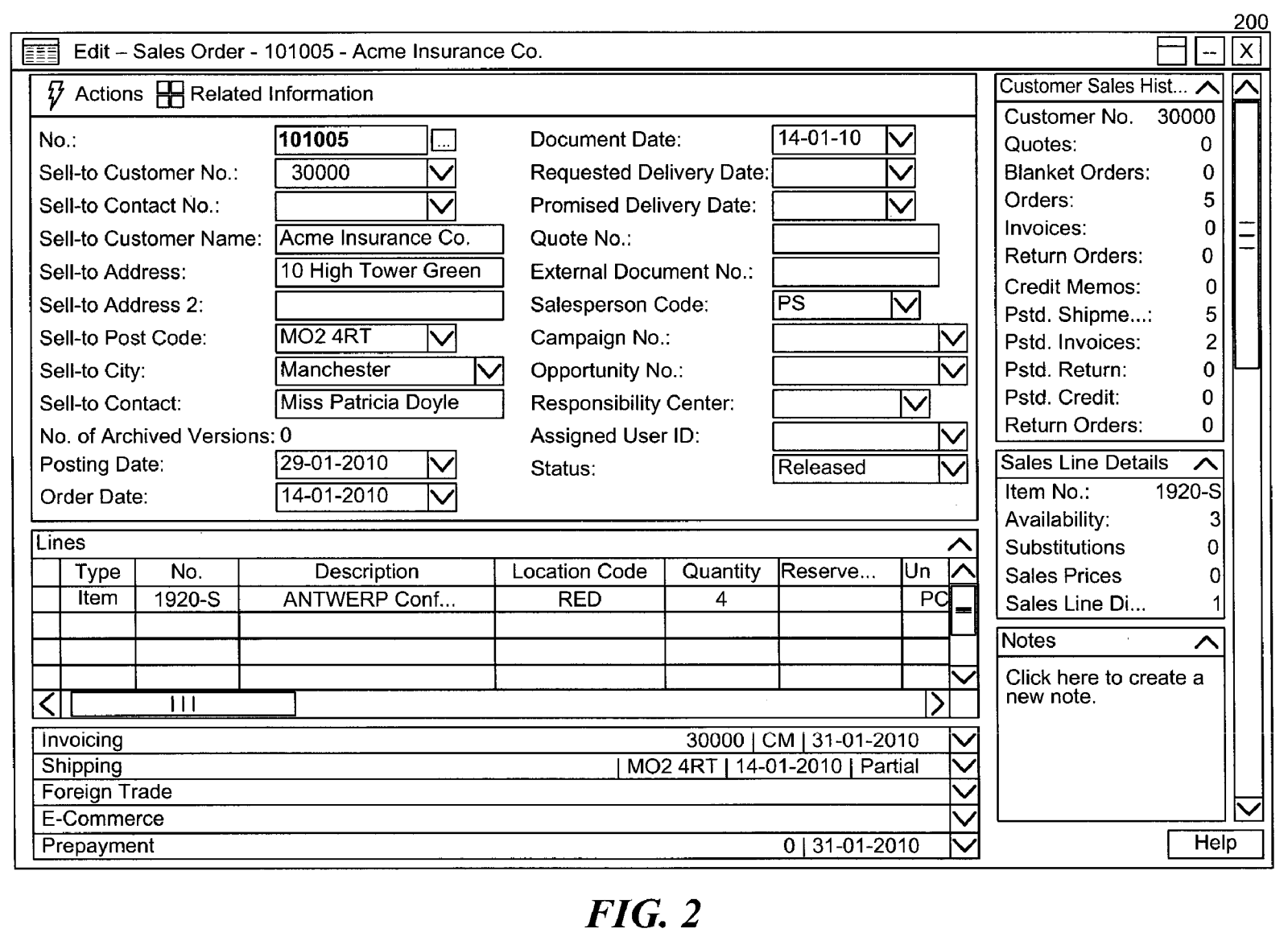

FIG. 2 illustrates a user interface of a pages version of an application that uses pages. The user interface 200 corresponds to a pages version of user interface 100. Because pages are defined in terms of a logical layout only, the actual locations of the fields of a form are determined by the application, rather than the developer. In this example, the "Posting Date" and the "Order Date" fields have been located at the bottom of the first column of fields in user interface 200, rather than the top of the first column of fields in user interface 100. Because the pages specify the relative layout of the fields, rather than the physical layout, the application is free to locate the fields as appropriate to accommodate displays of varying sizes and aspect ratios.

FIG. 3 is a block diagram that illustrates components of the transformation system in some embodiments. The transformation system includes an export form component 301, a transform forms to pages component 302, and an import page component 303. The export form component exports form 304, which is in the internal format of a forms version of an application, into a form file 305, which is in a form XML format that complies with a form schema 308. The transform forms to pages component inputs a form file 305 in XML format and outputs a page file 306 in a page XML format that complies with a page schema 309. The transform forms to pages component inputs configuration data 320 for help in guiding the transformation process. The configuration data may include a code rules file 321, an ignore pages file 322, a move pages file 323, a transform pages file 324, a delete page element file 325, and a move page element file 326 as described below. The transform forms to pages component may output a log file 310 that specifies problems encountered during the transformation process. Such problems may be identified when the page file 306 does not conform with the page schema 309. The information may be used by a forms developer to identify portions of the page file 306 that may need to be manually adjusted.

The code rules file contains rules for code patterns to search for in forms and replacement code for the pages. For example, if the forms code supported a "case" statement, but the pages code does not, then a code rule may specify that a case pattern is to be replaced by an if-then-else pattern. Such a rule may be in the following format:

```
<find>
case else
<replace>
If true then begin
```

The find tag defines the pattern to search for, and the replace tag defines the replacement code. In this example, each occurrence of "case else" is to be replaced with "If true then begin." The transformation system may allow the code pattern to be specified using regular expressions (e.g., using wildcard characters).

The ignore pages file contains identifiers of pages that are to be ignored during the transformation process. The transformation system removes these pages from the file being transformed during the transformation process.

The move pages file contains identifiers of pages that are to be moved to another page. Each page to be moved is identified by its identifier and name, and its destination is identified by a page identifier and its name.

The transform pages file contains, for various pages, certain custom transformations for each of those pages. For example, a custom transformation may be to add properties to a page (e.g., relating to visibility of a form) or to add code to take certain actions when certain conditions are met. As another example, a custom transformation may be to convert a specification of a control of a form to the corresponding format for a control on a page.

The delete page element file specifies page elements (e.g., fields) that are to be deleted from pages. For example, a help button may be automatically added to each page by the pages version of the application. In such a case, the help button on any form should be removed as part of the transformation process.

The move page element file specifies page elements to be moved from one page to another page during the transformation process. A page element may need to be moved, for example, if various forms can be combined into a single page.

The import page component 303 inputs the page file 306 in the XML format and stores the page 307 in the internal format of the pages version of the application.

The transformation system may be implemented on a computing device that may include a central processing unit, memory, input devices, output devices, storage devices, and communication ports. The memory and storage devices are computer-readable storage media that may be encoded with computer-executable instructions that implement the components of the transformation system, which means a computer-readable storage medium that contains the instructions. In addition, the instructions, data structures, and message structures may be stored or transmitted via a data transmission medium, such as a signal on a communication link.

Embodiments of the transformation system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The components of the transformation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
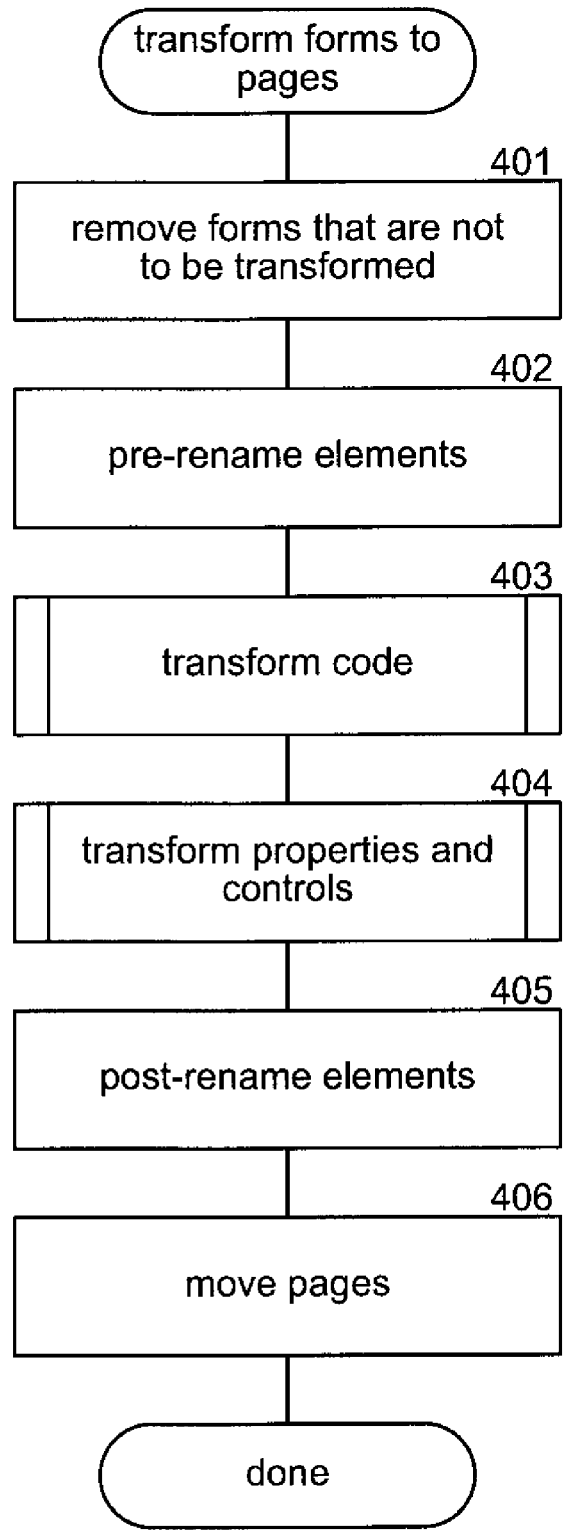
FIG. 4 is a flow diagram that illustrates the processing of the transform forms to pages component of the transformation system in some embodiments.

FIG. 4 is a flow diagram that illustrates the processing of the transform forms to pages component of the transformation system in some embodiments. This component controls the overall transformation of an XML representation of forms into an XML representation of pages based on the configuration data. The component inputs a file with an XML representation of the forms and transforms that file into the XML representation of the pages. The component also applies transformations that are common to all forms, which may be hard-coded. For example, the component may rename elements of forms to conform with a naming convention of pages. In block 401, the component removes pages (or forms) from the file that are specified by the ignore pages file. In block 402, the component performs a pre-transformation renaming of forms to a page format as appropriate and modifies elements that reference those renamed forms. In block 403, the component invokes a transform code component to apply the code rules to the file. In block 404, the component invokes a transform property and control component to transform pages and move elements. In block 405, the component performs a post-transformation renaming of forms to a page format as appropriate and modifies elements that reference those renamed forms. In block 406, the component moves pages as specified by the move pages file and then completes.

Figure 5:
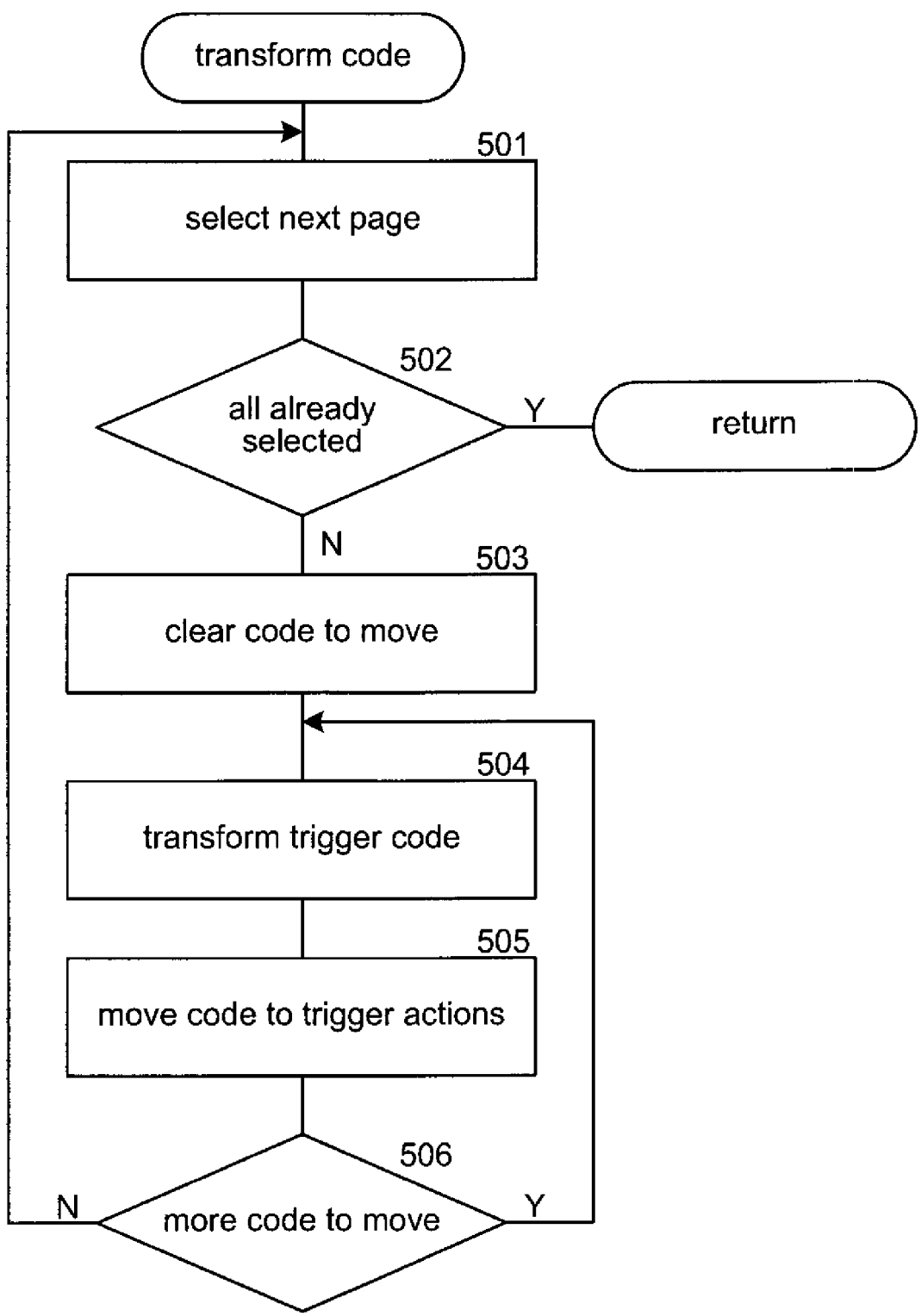
FIG. 5 is a flow diagram that illustrates the processing of the transform code component of the transformation system in some embodiments.

FIG. 5 is a flow diagram that illustrates the processing of the transform code component of the transformation system in some embodiments. The component loops processing each page of the input file. For each page, the component loops checking whether the code of the various triggers needs to be modified and/or moved until no more code needs to be moved. In block 501, the component selects the next page. In decision block 502, if all the pages have already been selected, then the component returns, else the component continues at block 503. In block 503, the component clears an indication of the code that is to be moved. In blocks 504-506, the component loops transforming the triggers and moving code. In block 504, the component transforms the forms code based on the code rules. The component may process each type of trigger (e.g., a mouse click) separately. The code rules may further specify the type of trigger to which they are to be applied. In block 505, the component moves code indicated by the transforming of the trigger code. In decision block 506, if there is more code to move, then the component loops to block 504 to again transform the trigger code, else the component loops to block 501 to select the next page.

Figure 6:
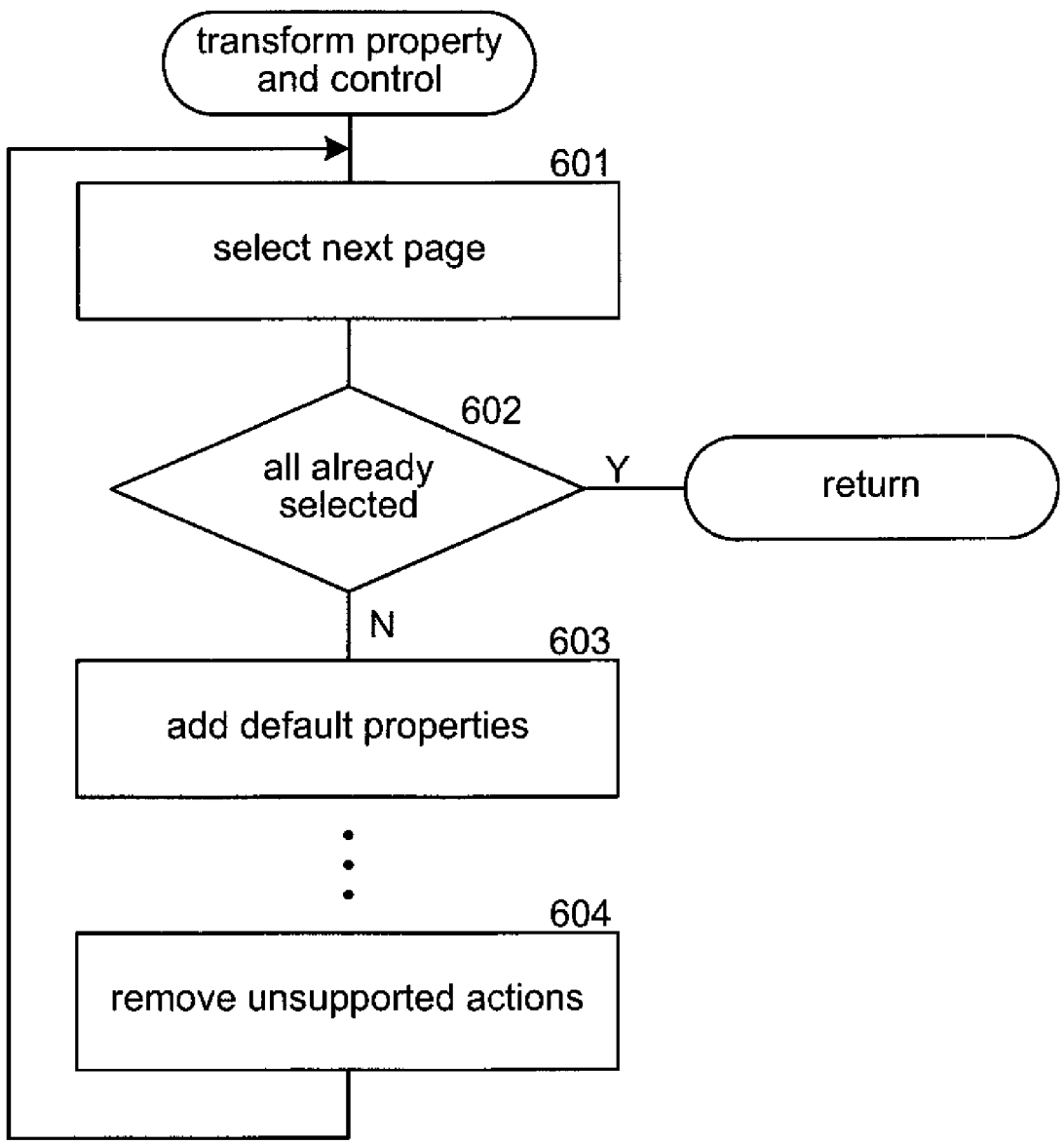
FIG. 6 is a flow diagram that illustrates the processing of the transform property and control component of the transformation system in some embodiments.

FIG. 6 is a flow diagram that illustrates the processing of the transform property and control component of the transformation system in some embodiments. The component transforms properties and controls of the pages in accordance with the transform pages file. In blocks 601-604, the component loops selecting each page and transforming that page. In block 601, the component selects the next page. In decision block 602, if all the pages have already been selected, then the component returns, else the component continues at block 603. In block 603, the component adds any default properties to the selected pages as indicated by the transform pages file. In block 604, the component removes any unsupported actions from the selected page as indicated by the transform pages file. The ellipsis between block 603 and block 604 indicates that additional modification of the properties and controls is performed in accordance with the transform pages file. The component then loops to block 601 to select the next page.

TABLE 1

```
<?xml version="1.0" encoding="utf-8"?>
<xs:schema xmlns="urn:schemas-microsoft-com:dynamics:NAV:ApplicationObjects"
    targetNamespace="urn:schemas-microsoft-com:dynamics:NAV:ApplicationObjects"
    elementFormDefault="qualified"
    xmlns:xs="http://www.w3.org/2001/XMLSchema">
  <xs:include schemaLocation="Common.xsd"/>
  <xs:element name="Form" type="FormType"/>
  <xs:complexType name="FormType">
    <xs:all>
      <xs:element name="Properties" type="FormPropertiesType" maxOccurs="1"/>
      <xs:element name="Triggers" type="FormTriggersType" maxOccurs="1" />
      <xs:element name="Controls" type="FormControlsType" maxOccurs="1"/>
      <xs:element name="Code" type="xs:string" minOccurs="0" maxOccurs="1"/>
    </xs:all>
    <xs:attributeGroup ref="ObjectAttributes"/>
  </xs:complexType>
  <xs:complexType name="FormPropertiesType">
    <xs:all>
      <xs:element name="Caption" type="xs:string" minOccurs="0" maxOccurs="1"/>
      <xs:element name="CaptionML" type="xs:string" minOccurs="0" maxOccurs="1"/>
      <xs:element name="DataCaptionExpr" type="xs:string" minOccurs="0" maxOccurs="1"/>
      <xs:element name="DataCaptionFields" type="xs:string" minOccurs="0" maxOccurs="1"/>
      <xs:element name="BorderStyle" minOccurs="0" maxOccurs="1">
        <xs:simpleType>
          <xs:restriction base="xs:string">
```

TABLE 1-continued

```
        <xs:enumeration value="None" />
        <xs:enumeration value="Single" />
        <xs:enumeration value="Double" />
      </xs:restriction>
    </xs:simpleType>
  </xs:element>
  <xs:element name="CaptionBar" minOccurs="0" maxOccurs="1">
    <xs:simpleType>
      <xs:restriction base="xs:string">
        <xs:enumeration value="None" />
        <xs:enumeration value="Normal" />
        <xs:enumeration value="Narrow" />
      </xs:restriction>
    </xs:simpleType>
  </xs:element>
  <xs:element name="Minimizable" type="NavBoolType" minOccurs="0" maxOccurs="1"/>
  <xs:element name="Maximizable" type="NavBoolType" minOccurs="0" maxOccurs="1"/>
  <xs:element name="Sizeable" type="NavBoolType" minOccurs="0" maxOccurs="1"/>
  <xs:element name="LogWidth" type="xs:integer" minOccurs="0" maxOccurs="1"/>
  <xs:element name="LogHeight" type="xs:integer" minOccurs="0" maxOccurs="1"/>
  <xs:element name="Width" type="xs:integer" minOccurs="0" maxOccurs="1"/>
  <xs:element name="Height" type="xs:integer" minOccurs="0" maxOccurs="1"/>
  <xs:element name="XPos" type="xs:integer" minOccurs="0" maxOccurs="1"/>
  <xs:element name="YPos" type="xs:integer" minOccurs="0" maxOccurs="1"/>
  <xs:element name="BackColor" type="xs:integer" minOccurs="0" maxOccurs="1"/>
  <xs:element name="Visible" type="NavBoolType" minOccurs="0" maxOccurs="1"/>
  <xs:element name="Editable" type="NavBoolType" minOccurs="0" maxOccurs="1"/>
  <xs:element name="ActiveControlOnOpen" type="xs:integer" minOccurs="0" maxOccurs="1"/>
  <xs:element name="MinimizedOnOpen" type="NavBoolType" minOccurs="0" maxOccurs="1"/>
  <xs:element name="MaximizedOnOpen" type="NavBoolType" minOccurs="0" maxOccurs="1"/>
  <xs:element name="AutoPosition" minOccurs="0" maxOccurs="1">
    <xs:simpleType>
      <xs:restriction base="xs:string">
        <xs:enumeration value="None" />
        <xs:enumeration value="CenterScreen" />
        <xs:enumeration value="CenterActiveForm" />
        <xs:enumeration value="OutsideActiveForm" />
        <xs:enumeration value="OutsideActiveControl" />
      </xs:restriction>
    </xs:simpleType>
  </xs:element>
  <xs:element name="InsertAllowed" type="NavBoolType" minOccurs="0" maxOccurs="1"/>
  <xs:element name="ModifyAllowed" type="NavBoolType" minOccurs="0" maxOccurs="1"/>
  <xs:element name="DeleteAllowed" type="NavBoolType" minOccurs="0" maxOccurs="1"/>
  <xs:element name="MultipleNewLines" type="NavBoolType" minOccurs="0" maxOccurs="1"/>
  <xs:element name="Description" type="xs:string" minOccurs="0" maxOccurs="1"/>
  <xs:element name="TableBoxID" type="xs:integer" minOccurs="0" maxOccurs="1"/>
  <xs:element name="LookupMode" type="NavBoolType" minOccurs="0" maxOccurs="1"/>
  <xs:element name="CalcFields" type="xs:string" minOccurs="0" maxOccurs="1" />
  <xs:element name="SourceTable" type="xs:string" minOccurs="0" maxOccurs="1"/>
  <xs:element name="SourceTableView" type="xs:string" minOccurs="0" maxOccurs="1"/>
  <xs:element name="SourceTablePlacement" minOccurs="0" maxOccurs="1">
    <xs:simpleType>
      <xs:restriction base="xs:string">
        <xs:enumeration value="First" />
        <xs:enumeration value="Last" />
        <xs:enumeration value="Record" />
        <xs:enumeration value="Saved" />
      </xs:restriction>
    </xs:simpleType>
  </xs:element>
  <xs:element name="SourceTableRecord" type="xs:string" minOccurs="0" maxOccurs="1"/>
  <xs:element name="SourceTableTemporary" type="NavBoolType" minOccurs="0" maxOccurs="1"/>
  <xs:element name="SaveTableView" type="NavBoolType" minOccurs="0" maxOccurs="1"/>
  <xs:element name="SaveControlInfo" type="NavBoolType" minOccurs="0" maxOccurs="1"/>
  <xs:element name="SaveColumnWidths" type="NavBoolType" minOccurs="0" maxOccurs="1"/>
  <xs:element name="SaveValues" type="NavBoolType" minOccurs="0" maxOccurs="1"/>
  <xs:element name="SavePosAndSize" type="NavBoolType" minOccurs="0" maxOccurs="1"/>
  <xs:element name="AutoSplitKey" type="NavBoolType" minOccurs="0" maxOccurs="1"/>
  <xs:element name="UpdateOnActivate" type="NavBoolType" minOccurs="0" maxOccurs="1"/>
  <xs:element name="DelayedInsert" type="NavBoolType" minOccurs="0" maxOccurs="1"/>
  <xs:element name="PopulateAllFields" type="NavBoolType" minOccurs="0" maxOccurs="1"/>
  <xs:element name="Permissions" type="xs:string" minOccurs="0" maxOccurs="1" />
  <xs:element name="HorzGrid" type="xs:integer" minOccurs="0" maxOccurs="1"/>
  <xs:element name="VertGrid" type="xs:integer" minOccurs="0" maxOccurs="1"/>
  <xs:element name="TimerInterval" type="xs:integer" minOccurs="0" maxOccurs="1"/>
  <xs:element name="LinksAllowed" type="NavBoolType" minOccurs="0" maxOccurs="1"/>
</xs:all>
</xs:complexType>
<xs:complexType name="FormTriggersType">
```

TABLE 1-continued

```
<xs:all>
 <xs:element name="OnInit" type="xs:string" minOccurs="0" maxOccurs="1"/>
 <xs:element name="OnOpenForm" type="xs:string" minOccurs="0" maxOccurs="1"/>
 <xs:element name="OnCloseForm" type="xs:string" minOccurs="0" maxOccurs="1"/>
 <xs:element name="OnQueryCloseForm" type="xs:string" minOccurs="0" maxOccurs="1"/>
 <xs:element name="OnActivateForm" type="xs:string" minOccurs="0" maxOccurs="1"/>
 <xs:element name="OnDeactivateForm" type="xs:string" minOccurs="0" maxOccurs="1"/>
 <xs:element name="OnFindRecord" type="xs:string" minOccurs="0" maxOccurs="1"/>
 <xs:element name="OnNextRecord" type="xs:string" minOccurs="0" maxOccurs="1"/>
 <xs:element name="OnAfterGetRecord" type="xs:string" minOccurs="0" maxOccurs="1"/>
 <xs:element name="OnAfterGetCurrRecord" type="xs:string" minOccurs="0" maxOccurs="1"/>
 <xs:element name="OnBeforePutRecord" type="xs:string" minOccurs="0" maxOccurs="1"/>
 <xs:element name="OnNewRecord" type="xs:string" minOccurs="0" maxOccurs="1"/>
 <xs:element name="OnInsertRecord" type="xs:string" minOccurs="0" maxOccurs="1"/>
 <xs:element name="OnModifyRecord" type="xs:string" minOccurs="0" maxOccurs="1"/>
 <xs:element name="OnDeleteRecord" type="xs:string" minOccurs="0" maxOccurs="1"/>
 <xs:element name="OnTimer" type="xs:string" minOccurs="0" maxOccurs="1"/>
 <xs:element name="OnCreateHyperlink" type="xs:string" minOccurs="0" maxOccurs="1"/>
 <xs:element name="OnHyperlink" type="xs:string" minOccurs="0" maxOccurs="1"/>
</xs:all>
</xs:complexType>
<xs:complexType name="FormControlsType">
 <xs:sequence>
  <xs:element name="Control" type="FormControlType" minOccurs="0" maxOccurs="unbounded"/>
 </xs:sequence>
</xs:complexType>
<xs:complexType name="FormControlType">
 <xs:all>
  <xs:element name="Properties" type="FormControlPropertiesType" maxOccurs="1"/>
  <xs:element name="Menu" type="Menu" minOccurs="0" maxOccurs="1"/>
  <xs:element name="Triggers" type ="FormControlTriggersType" minOccurs="0" maxOccurs ="1"/>
 </xs:all>
</xs:complexType>
<xs:complexType name="FormControlPropertiesType">
 <xs:all>
  <xs:element name="ID" type="xs:integer" maxOccurs="1"/>
  <xs:element name="Controltype" minOccurs="0" maxOccurs="1">
   <xs:simpleType>
    <xs:restriction base="xs:string">
     <xs:enumeration value="Label" />
     <xs:enumeration value="TextBox" />
     <xs:enumeration value="CheckBox" />
     <xs:enumeration value="OptionButton" />
     <xs:enumeration value="CommandButton" />
     <xs:enumeration value="MenuButton" />
     <xs:enumeration value="Frame" />
     <xs:enumeration value="Image" />
     <xs:enumeration value="PictureBox" />
     <xs:enumeration value="Shape" />
     <xs:enumeration value="Indicator" />
     <xs:enumeration value="TabControl" />
     <xs:enumeration value="TableBox" />
     <xs:enumeration value="MatrixBox" />
     <xs:enumeration value="MenuItem" />
     <xs:enumeration value="SubForm" />
    </xs:restriction>
   </xs:simpleType>
  </xs:element>
  <xs:element name="Name" type="xs:string" minOccurs="0" maxOccurs="1"/>
  <xs:element name="XPos" type="xs:string" minOccurs="0" maxOccurs="1"/>
  <xs:element name="YPos" type="xs:string" minOccurs="0" maxOccurs="1"/>
  <xs:element name="Width" type="xs:integer" minOccurs="0" maxOccurs="1"/>
  <xs:element name="Height" type="xs:integer" minOccurs="0" maxOccurs="1"/>
  <xs:element name="HorzGlue" minOccurs="0" maxOccurs="1">
   <xs:simpleType>
    <xs:restriction base="xs:string">
     <xs:enumeration value="Left" />
     <xs:enumeration value="Right" />
     <xs:enumeration value="Both" />
    </xs:restriction>
   </xs:simpleType>
  </xs:element>
  <xs:element name="VertGlue" minOccurs="0" maxOccurs="1">
   <xs:simpleType>
    <xs:restriction base="xs:string">
     <xs:enumeration value="Top" />
     <xs:enumeration value="Bottom" />
     <xs:enumeration value="Both" />
    </xs:restriction>
   </xs:simpleType>
  </xs:element>
```

TABLE 1-continued

```
  </xs:element>
  <xs:element name="Visible" type="NavBoolType" minOccurs="0" maxOccurs="1"/>
  <xs:element name="Enabled" type="NavBoolType" minOccurs="0" maxOccurs="1"/>
  <xs:element name="Editable" type="NavBoolType" minOccurs="0" maxOccurs="1"/>
  <xs:element name="Focusable" type="NavBoolType" minOccurs="0" maxOccurs="1"/>
  <xs:element name="FocusOnClick" type="NavBoolType" minOccurs="0" maxOccurs="1"/>
  <xs:element name="Default" type="NavBoolType" minOccurs="0" maxOccurs="1"/>
  <xs:element name="Cancel" type="NavBoolType" minOccurs="0" maxOccurs="1"/>
  <xs:element name="ParentControl" type="xs:integer" minOccurs="0" maxOccurs="1"/>
  <xs:element name="InFrame" type="NavBoolType" minOccurs="0" maxOccurs="1"/>
  <xs:element name="InPage" type="xs:integer" minOccurs="0" maxOccurs="1"/>
  <xs:element name="InColumn" type="NavBoolType" minOccurs="0" maxOccurs="1"/>
  <xs:element name="InColumnHeading" type="NavBoolType" minOccurs="0" maxOccurs="1"/>
  <xs:element name="InMatrix" type="NavBoolType" minOccurs="0" maxOccurs="1"/>
  <xs:element name="InMatrixHeading" type="NavBoolType" minOccurs="0" maxOccurs="1"/>
  <xs:element name="Caption" type="xs:string" minOccurs="0" maxOccurs="1"/>
  <xs:element name="CaptionML" type="xs:string" minOccurs="0" maxOccurs="1"/>
  <xs:element name="ShowCaption" type="NavBoolType" minOccurs="0" maxOccurs="1"/>
  <xs:element name="HorzAlign" minOccurs="0" maxOccurs="1">
    <xs:simpleType>
      <xs:restriction base="xs:string">
        <xs:enumeration value="General" />
        <xs:enumeration value="Left" />
        <xs:enumeration value="Right" />
        <xs:enumeration value="Center" />
      </xs:restriction>
    </xs:simpleType>
  </xs:element>
  <xs:element name="VertAlign" minOccurs="0" maxOccurs="1">
    <xs:simpleType>
      <xs:restriction base="xs:string">
        <xs:enumeration value="Top" />
        <xs:enumeration value="Bottom" />
        <xs:enumeration value="Center" />
      </xs:restriction>
    </xs:simpleType>
  </xs:element>
  <xs:element name="ForeColor" type="xs:integer" minOccurs="0" maxOccurs="1"/>
  <xs:element name="BackColor" type="xs:integer" minOccurs="0" maxOccurs="1"/>
  <xs:element name="BackTransparent" type="NavBoolType" minOccurs="0" maxOccurs="1"/>
  <xs:element name="Border" type="NavBoolType" minOccurs="0" maxOccurs="1"/>
  <xs:element name="BorderColor" type="xs:integer" minOccurs="0" maxOccurs="1"/>
  <xs:element name="BorderStyle" minOccurs="0" maxOccurs="1">
    <xs:simpleType>
      <xs:restriction base="xs:string">
        <xs:enumeration value="Normal" />
        <xs:enumeration value="Raised" />
        <xs:enumeration value="Sunken" />
        <xs:enumeration value="SemiSunken" />
        <xs:enumeration value="BumpUp" />
        <xs:enumeration value="BumpDown" />
      </xs:restriction>
    </xs:simpleType>
  </xs:element>
  <xs:element name="BorderWidth" minOccurs="0" maxOccurs="1">
    <xs:simpleType>
      <xs:restriction base="xs:string">
        <xs:enumeration value="Hairline" />
        <xs:enumeration value="1pt" />
        <xs:enumeration value="2pt" />
        <xs:enumeration value="3pt" />
        <xs:enumeration value="4pt" />
        <xs:enumeration value="5pt" />
        <xs:enumeration value="6pt" />
        <xs:enumeration value="7pt" />
        <xs:enumeration value="8pt" />
        <xs:enumeration value="9pt" />
      </xs:restriction>
    </xs:simpleType>
  </xs:element>
  <xs:element name="FontName" type="xs:string" minOccurs="0" maxOccurs="1"/>
  <xs:element name="FontSize" type="xs:integer" minOccurs="0" maxOccurs="1"/>
  <xs:element name="FontBold" type="NavBoolType" minOccurs="0" maxOccurs="1"/>
  <xs:element name="FontItalic" type="NavBoolType" minOccurs="0" maxOccurs="1"/>
  <xs:element name="FontStrikethru" type="NavBoolType" minOccurs="0" maxOccurs="1"/>
  <xs:element name="FontUnderline" type="NavBoolType" minOccurs="0" maxOccurs="1"/>
  <xs:element name="MultiLine" type="NavBoolType" minOccurs="0" maxOccurs="1"/>
  <xs:element name="PadChar" type="xs:string" minOccurs="0" maxOccurs="1"/>
  <xs:element name="LeaderDots" type="NavBoolType" minOccurs="0" maxOccurs="1"/>
  <xs:element name="MaxLength" type="xs:integer" minOccurs="0" maxOccurs="1"/>
```

TABLE 1-continued

```
<xs:element name="PasswordText" type="NavBoolType" minOccurs="0" maxOccurs="1"/>
<xs:element name="AutoEnter" type="NavBoolType" minOccurs="0" maxOccurs="1"/>
<xs:element name="BitmapPos" minOccurs="0" maxOccurs="1">
 <xs:simpleType>
  <xs:restriction base="xs:string">
    <xs:enumeration value="None" />
    <xs:enumeration value="Left" />
    <xs:enumeration value="Right" />
    <xs:enumeration value="Top" />
    <xs:enumeration value="Bottom" />
    <xs:enumeration value="Center" />
  </xs:restriction>
 </xs:simpleType>
</xs:element>
<xs:element name="AutoRepeat" type="NavBoolType" minOccurs="0" maxOccurs="1"/>
<xs:element name="PushAction" minOccurs="0" maxOccurs="1">
 <xs:simpleType>
  <xs:restriction base="xs:string">
    <xs:enumeration value="OK" />
    <xs:enumeration value="Cancel" />
    <xs:enumeration value="LookupOK" />
    <xs:enumeration value="LookupCancel" />
    <xs:enumeration value="Yes" />
    <xs:enumeration value="No" />
    <xs:enumeration value="Close" />
    <xs:enumeration value="Stop" />
    <xs:enumeration value="FormHelp" />
    <xs:enumeration value="RunObject" />
    <xs:enumeration value="RunSystem" />
    <xs:enumeration value="LookupTable" />
  </xs:restriction>
 </xs:simpleType>
</xs:element>
<xs:element name="InvalidActionAppearance" minOccurs="0" maxOccurs="1">
 <xs:simpleType>
  <xs:restriction base="xs:string">
    <xs:enumeration value="Normal" />
    <xs:enumeration value="Disable" />
    <xs:enumeration value="Hide" />
  </xs:restriction>
 </xs:simpleType>
</xs:element>
<xs:element name="Bitmap" type="xs:string" minOccurs="0" maxOccurs="1"/>
<xs:element name="BitmapList" type="xs:string" minOccurs="0" maxOccurs="1"/>
<xs:element name="ShapeStyle" minOccurs="0" maxOccurs="1">
 <xs:simpleType>
  <xs:restriction base="xs:string">
    <xs:enumeration value="Rectangle" />
    <xs:enumeration value="Rounded Rectangle" />
    <xs:enumeration value="Oval" />
    <xs:enumeration value="Triangle" />
    <xs:enumeration value="NW-Line" />
    <xs:enumeration value="NE-Line" />
    <xs:enumeration value="HorzLine" />
    <xs:enumeration value="VertLine" />
  </xs:restriction>
 </xs:simpleType>
</xs:element>
<xs:element name="Orientation" minOccurs="0" maxOccurs="1">
 <xs:simpleType>
  <xs:restriction base="xs:string">
    <xs:enumeration value="Left" />
    <xs:enumeration value="Right" />
    <xs:enumeration value="Top" />
    <xs:enumeration value="Bottom" />
  </xs:restriction>
 </xs:simpleType>
</xs:element>
<xs:element name="Percentage" type="NavBoolType" minOccurs="0"/>
<xs:element name="MenuItemType" minOccurs="0" maxOccurs="1">
 <xs:simpleType>
  <xs:restriction base="xs:string">
    <xs:enumeration value="MenuItem" />
    <xs:enumeration value="Separator" />
  </xs:restriction>
 </xs:simpleType>
</xs:element>
<xs:element name="ShortCutKey" type="xs:string" minOccurs="0" maxOccurs="1"/>
<xs:element name="Ellipsis" type="NavBoolType" minOccurs="0" maxOccurs="1"/>
<xs:element name="MenuLevel" type="xs:integer" minOccurs="0" maxOccurs="1"/>
```

TABLE 1-continued

```xml
<xs:element name="TopLineOnly" type="NavBoolType" minOccurs="0" maxOccurs="1"/>
<xs:element name="PageNames" type="xs:string" minOccurs="0" maxOccurs="1"/>
<xs:element name="PageNamesML" type="xs:string" minOccurs="0" maxOccurs="1"/>
<xs:element name="RowHeight" type="xs:integer" minOccurs="0" maxOccurs="1"/>
<xs:element name="MatrixColumnWidth" type="xs:integer" minOccurs="0" maxOccurs="1"/>
<xs:element name="HeadingHeight" type="xs:integer" minOccurs="0" maxOccurs="1"/>
<xs:element name="ToolTip" type="xs:string" minOccurs="0" maxOccurs="1"/>
<xs:element name="ToolTipML" type="xs:string" minOccurs="0" maxOccurs="1"/>
<xs:element name="Lookup" type="NavBoolType" minOccurs="0" maxOccurs="1"/>
<xs:element name="DrillDown" type="NavBoolType" minOccurs="0" maxOccurs="1"/>
<xs:element name="AssistEdit" type="NavBoolType" minOccurs="0" maxOccurs="1"/>
<xs:element name="DropDown" type="NavBoolType" minOccurs="0" maxOccurs="1"/>
<xs:element name="PermanentAssist" type="NavBoolType" minOccurs="0" maxOccurs="1"/>
<xs:element name="InlineEditing" type="NavBoolType" minOccurs="0" maxOccurs="1"/>
<xs:element name="Description" type="xs:string" minOccurs="0" maxOccurs="1"/>
<xs:element name="OptionString" type="xs:string" minOccurs="0" maxOccurs="1"/>
<xs:element name="OptionCaption" type="xs:string" minOccurs="0" maxOccurs="1"/>
<xs:element name="OptionCaptionML" type="xs:string" minOccurs="0" maxOccurs="1"/>
<xs:element name="DecimalPlaces" type="xs:string" minOccurs="0" maxOccurs="1"/>
<xs:element name="Title" type="NavBoolType" minOccurs="0" maxOccurs="1"/>
<xs:element name="MinValue" type="xs:string" minOccurs="0" maxOccurs="1"/>
<xs:element name="MaxValue" type="xs:string" minOccurs="0" maxOccurs="1"/>
<xs:element name="NotBlank" type="NavBoolType" minOccurs="0" maxOccurs="1"/>
<xs:element name="Numeric" type="NavBoolType" minOccurs="0" maxOccurs="1"/>
<xs:element name="CharAllowed" type="xs:string" minOccurs="0" maxOccurs="1"/>
<xs:element name="DateFormula" type="NavBoolType" minOccurs="0" maxOccurs="1"/>
<xs:element name="ClosingDates" type="NavBoolType" minOccurs="0" maxOccurs="1"/>
<xs:element name="ValuesAllowed" type="xs:string" minOccurs="0" maxOccurs="1"/>
<xs:element name="NextControl" type="xs:integer" minOccurs="0" maxOccurs="1"/>
<xs:element name="OptionValue" type="xs:string" minOccurs="0" maxOccurs="1"/>
<xs:element name="StepValue" type="xs:string" minOccurs="0" maxOccurs="1"/>
<xs:element name="ClearOnLookup" type="NavBoolType" minOccurs="0" maxOccurs="1"/>
<xs:element name="Format" type="xs:string" minOccurs="0" maxOccurs="1"/>
<xs:element name="BlankNumbers" minOccurs="0" maxOccurs="1">
  <xs:simpleType>
    <xs:restriction base="xs:string">
      <xs:enumeration value="DontBlank" />
      <xs:enumeration value="BlankNeg" />
      <xs:enumeration value="BlankNegAndZero" />
      <xs:enumeration value="BlankZero" />
      <xs:enumeration value="BlankZeroAndPos" />
      <xs:enumeration value="BlankPos" />
    </xs:restriction>
  </xs:simpleType>
</xs:element>
<xs:element name="BlankZero" type="NavBoolType" minOccurs="0" maxOccurs="1"/>
<xs:element name="SignDisplacement" type="xs:integer" minOccurs="0" maxOccurs="1"/>
<xs:element name="AutoFormatType" type="xs:integer" minOccurs="0" maxOccurs="1"/>
<xs:element name="AutoFormatExpr" type="xs:string" minOccurs="0" maxOccurs="1"/>
<xs:element name="CaptionClass" type="xs:string" minOccurs="0" maxOccurs="1"/>
<xs:element name="Divisor" type="xs:string" minOccurs="0" maxOccurs="1"/>
<xs:element name="SourceExpr" type="xs:string" minOccurs="0" maxOccurs="1"/>
<xs:element name="SubFormID" type="xs:string" minOccurs="0" maxOccurs="1"/>
<xs:element name="SubFormView" type="xs:string" minOccurs="0" maxOccurs="1"/>
<xs:element name="SubFormLink" type="xs:string" minOccurs="0" maxOccurs="1"/>
<xs:element name="AutoCalcField" type="NavBoolType" minOccurs="0" maxOccurs="1"/>
<xs:element name="TableRelation" type="xs:string" minOccurs="0" maxOccurs="1"/>
<xs:element name="ValidateTableRelation" type="NavBoolType" minOccurs="0" maxOccurs="1"/>
<xs:element name="RunObject" type="xs:string" minOccurs="0" maxOccurs="1"/>
<xs:element name="RunFormView" type="xs: string" minOccurs="0" maxOccurs="1"/>
<xs:element name="RunFormLink" type="xs:string" minOccurs="0" maxOccurs="1"/>
<xs:element name="RunFormLinkType" minOccurs="0" maxOccurs="1">
  <xs:simpleType>
    <xs:restriction base="xs:string">
      <xs:enumeration value="OnOpen" />
      <xs:enumeration value="OnUpdate" />
    </xs:restriction>
  </xs:simpleType>
</xs:element>
<xs:element name="RunCommand" type="xs:string" minOccurs="0" maxOccurs="1"/>
<xs:element name="LookupFormID" type="xs:string" minOccurs="0" maxOccurs="1"/>
<xs:element name="DrillDownFormID" type="xs:string" minOccurs="0" maxOccurs="1"/>
<xs:element name="MatrixSourceTable" type="xs:string" minOccurs="0" maxOccurs="1"/>
<xs:element name="RunFormOnRec" type="NavBoolType" minOccurs="0" maxOccurs="1"/>
<xs:element name="UpdateOnAction" type="NavBoolType" minOccurs="0" maxOccurs="1"/>
<xs:element name="TestAutomationID" type="xs:string" minOccurs="0" maxOccurs="1"/>
</xs:all>
</xs:complexType>
<xs:complexType name="FormControlTriggersType">
<xs:all>
```

TABLE 1-continued

```
    <xs:element name="OnActivate" type="xs:string" minOccurs="0" maxOccurs="1"/>
    <xs:element name="OnDeactivate" type="xs:string" minOccurs="0" maxOccurs="1"/>
    <xs:element name="OnFormat" type="xs:string" minOccurs="0" maxOccurs="1"/>
    <xs:element name="OnBeforeInput" type="xs:string" minOccurs="0" maxOccurs="1"/>
    <xs:element name="OnInputChange" type="xs:string" minOccurs="0" maxOccurs="1"/>
    <xs:element name="OnAfterInput" type="xs:string" minOccurs="0" maxOccurs="1"/>
    <xs:element name="OnValidate" type="xs:string" minOccurs="0" maxOccurs="1"/>
    <xs:element name="OnAfterValidate" type="xs:string" minOccurs="0" maxOccurs="1"/>
    <xs:element name="OnLookup" type="xs:string" minOccurs="0" maxOccurs="1"/>
    <xs:element name="OnDrillDown" type="xs:string" minOccurs="0" maxOccurs="1"/>
    <xs:element name="OnAssistEdit" type="xs:string" minOccurs="0" maxOccurs="1"/>
    <xs:element name="OnPush" type="xs:string" minOccurs="0" maxOccurs="1"/>
    <xs:element name="OnFindRecord" type="xs:string" minOccurs="0" maxOccurs="1"/>
    <xs:element name="OnNextRecord" type="xs:string" minOccurs="0" maxOccurs="1"/>
    <xs:element name="OnAfterGetRecord" type="xs:string" minOccurs="0" maxOccurs="1"/>
    <xs:element name="OnAfterGetCurrRecord" type="xs:string" minOccurs="0" maxOccurs="1"/>
    <xs:element name="OnBeforePutRecord" type="xs:string" minOccurs="0" maxOccurs="1"/>
  </xs:all>
</xs:complexType>
<xs:complexType name="Menu">
  <xs:sequence>
    <xs:element name="Control" type="FormControlType" minOccurs="0" maxOccurs="unbounded"/>
  </xs:sequence>
</xs:complexType>
</xs:schema>
```

TABLE 2

```
<?xml version="1.0" encoding="utf-8"?>
<xs:schema xmlns="urn:schemas-microsoft-com:dynamics:NAV:ApplicationObjects"
targetNamespace="urn:schemas-microsoft-com:dynamics:NAV:ApplicationObjects"
elementFormDefault="qualified" xmlns:xs="http://www.w3.org/2001/XMLSChema">
  <xs:include schemaLocation="Common.xsd" />
  <xs:element name="Page" type="PageType" />
  <xs:complexType name="PageType">
    <xs:all>
      <xs:element name="Properties" type="PagePropertiesType" minOccurs="1" maxOccurs="1" />
      <xs:element name="SourceObject" type="PageSourceObjectType" minOccurs="1" maxOccurs="1" />
      <xs:element name="Triggers" type="PageTriggersType" minOccurs="1" maxOccurs="1" />
      <xs:element name="Actions" type="PageActionsType" minOccurs="1" maxOccurs="1" />
      <xs:element name="Controls" type="PageControlsType" minOccurs="1" maxOccurs="1" />
      <xs:element name="Code" type="xs:string" minOccurs="1" maxOccurs="1" />
    </xs:all>
    <xs:attributeGroup ref="ObjectAttributes" />
  </xs:complexType>
  <xs:complexType name="PagePropertiesType">
    <xs:all>
      <xs:element name="CaptionML" type="xs:string" minOccurs="0" maxOccurs="1" />
      <xs:element name="Editable" type="NavBoolType" minOccurs="0" maxOccurs="1" />
      <xs:element name="Description" type="xs:string" minOccurs="0" maxOccurs="1" />
      <xs:element name="Permissions" type="xs:string" minOccurs="0" maxOccurs="1" />
      <xs:element name="TimerUpdate" type="xs:integer" minOccurs="0" maxOccurs="1" />
      <xs:element name="PageType" type="PageTypeType" minOccurs="0" maxOccurs="1" default="Card" />
      <xs:element name="InstructionalTextML" type="xs:string" minOccurs="0" maxOccurs="1" />
      <xs:element name="CardFormID" type="xs:string" minOccurs="0" maxOccurs="1" />
      <xs:element name="DataCaptionExpr" type="xs:string" minOccurs="0" maxOccurs="1" />
      <xs:element name="DataCaptionFields" type="xs:string" minOccurs="0" maxOccurs="1" />
      <xs:element name="LinksAllowed" type="NavBoolType" minOccurs="0" maxOccurs="1" />
      <xs:element name="PopulateAllFields" type="NavBoolType" minOccurs="0" maxOccurs="1" />
      <xs:element name="DelayedInsert" type="NavBoolType" minOccurs="0" maxOccurs="1" />
    </xs:all>
  </xs:complexType>
  <xs:complexType name="PageSourceObjectType">
    <xs:all>
      <xs:element name="SourceTable" type="xs:string" minOccurs="0" maxOccurs="1" />
      <xs:element name="SourceTableView" type="xs:string" minOccurs="0" maxOccurs="1" />
      <xs:element name="InsertAllowed" type="NavBoolType" minOccurs="0" maxOccurs="1" />
      <xs:element name="ModifyAllowed" type="NavBoolType" minOccurs="0" maxOccurs="1" />
      <xs:element name="DeleteAllowed" type="NavBoolType" minOccurs="0" maxOccurs="1" />
      <xs:element name="MultipleNewLines" type="NavBoolType" minOccurs="0" maxOccurs="1" />
      <xs:element name="AutoSplitKey" type="NavBoolType" minOccurs="0" maxOccurs="1" />
      <xs:element name="SourceTableTemporary" type="NavBoolType" minOccurs="0" maxOccurs="1" />
      <xs:element name="ChartMeasureSource" type="xs:string" minOccurs="0" maxOccurs="1" />
      <xs:element name="ChartSeriesSource" type="xs:string" minOccurs="0" maxOccurs="1" />
      <xs:element name="ChartDimensionSource" type="xs:string" minOccurs="0" maxOccurs="1" />
      <xs:element name="ChartDimensionRange" type="xs:integer" minOccurs="0" maxOccurs="1" />
```

TABLE 2-continued

```xml
    <xs:element name="DataCaptionFields" type="xs:string" minOccurs="0" maxOccurs="1" />
    <xs:element name="ConfirmDeletion" type="NavBoolType" minOccurs="0" maxOccurs="1" />
  </xs:all>
</xs:complexType>
<xs:complexType name="PageTriggersType">
  <xs:all>
    <xs:element name="OnInit" type="xs:string" minOccurs="0" maxOccurs="1" />
    <xs:element name="OnOpenPage" type="xs:string" minOccurs="0" maxOccurs="1" />
    <xs:element name="OnClosePage" type="xs:string" minOccurs="0" maxOccurs="1" />
    <xs:element name="OnQueryClosePage" type="xs:string" minOccurs="0" maxOccurs="1" />
    <xs:element name="OnFindRecord" type="xs:string" minOccurs="0" maxOccurs="1" />
    <xs:element name="OnNextRecord" type="xs:string" minOccurs="0" maxOccurs="1" />
    <xs:element name="OnAfterGetRecord" type="xs:string" minOccurs="0" maxOccurs="1" />
    <xs:element name="OnNewRecord" type="xs:string" minOccurs="0" maxOccurs="1" />
    <xs:element name="OnInsertRecord" type="xs:string" minOccurs="0" maxOccurs="1" />
    <xs:element name="OnModifyRecord" type="xs:string" minOccurs="0" maxOccurs="1" />
    <xs:element name="OnDeleteRecord" type="xs:string" minOccurs="0" maxOccurs="1" />
  </xs:all>
</xs:complexType>
<xs:complexType name="PageActionsType">
  <xs:all>
    <xs:element name="NewDocumentItems" type="PageActionContainerType" minOccurs="0" maxOccurs="1" />
    <xs:element name="ActionItems" type="PageActionContainerType" minOccurs="0" maxOccurs="1" />
    <xs:element name="RelatedInformation" type="PageActionContainerType" minOccurs="0" maxOccurs="1" />
    <xs:element name="Reports" type="PageActionContainerType" minOccurs="0" maxOccurs="1" />
    <xs:element name="HomeItems" type="PageActionContainerType" minOccurs="0" maxOccurs="1" />
    <xs:element name="ActivityButtons" type="PageActionContainerType" minOccurs="0" maxOccurs="1" />
  </xs:all>
</xs:complexType>
<xs:complexType name="PageActionContainerType">
  <xs:sequence>
    <xs:element name="Properties" type="PageActionContainerPropertiesType" minOccurs="1" maxOccurs="1" />
    <xs:choice minOccurs="0" maxOccurs="unbounded">
      <xs:element name="ActionGroup" type="PageActionGroupType" maxOccurs="1" />
      <xs:element name="Action" type="PageActionType" maxOccurs="1" />
      <xs:element name="Separator" type="PageActionSeparatorType" maxOccurs="1" />
    </xs:choice>
  </xs:sequence>
</xs:complexType>
<xs:complexType name="PageActionContainerPropertiesType">
  <xs:all>
    <xs:element name="ID" type="xs:string" maxOccurs="1" />
    <xs:element name="Name" type="xs:string" minOccurs="0" maxOccurs="1" />
    <xs:element name="CaptionML" type="xs:string" minOccurs="0" maxOccurs="1" />
    <xs:element name="Description" type="xs:string" minOccurs="0" maxOccurs="1" />
    <xs:element name="Enabled" type="xs:string" minOccurs="0" maxOccurs="1" />
  </xs:all>
</xs:complexType>
<xs:complexType name="PageActionGroupType">
  <xs:sequence>
    <xs:element name="Properties" type="PageActionGroupPropertiesType" minOccurs="1" maxOccurs="1" />
    <xs:choice minOccurs="0" maxOccurs="unbounded">
      <xs:element name="ActionGroup" type="PageActionGroupType" maxOccurs="1" />
      <xs:element name="Action" type="PageActionType" maxOccurs="1" />
      <xs:element name="Separator" type="PageActionSeparatorType" maxOccurs="1" />
    </xs:choice>
  </xs:sequence>
</xs:complexType>
<xs:complexType name="PageActionGroupPropertiesType">
  <xs:all>
    <xs:element name="ID" type="xs:string" maxOccurs="1" />
    <xs:element name="Name" type="xs:string" minOccurs="0" maxOccurs="1" />
    <xs:element name="CaptionML" type="xs:string" minOccurs="0" maxOccurs="1" />
    <xs:element name="Description" type="xs:string" minOccurs="0" maxOccurs="1" />
    <xs:element name="Enabled" type="xs:string" minOccurs="0" maxOccurs="1" />
    <xs:element name="Visible" type="xs:string" minOccurs="0" maxOccurs="1" />
  </xs:all>
</xs:complexType>
<xs:complexType name="PageActionType">
  <xs:all>
    <xs:element name="ID" type="xs:string" maxOccurs="1" />
    <xs:element name="Name" type="xs:string" minOccurs="0" maxOccurs="1" />
    <xs:element name="CaptionML" type="xs:string" minOccurs="0" maxOccurs="1" />
    <xs:element name="ToolTipML" type="xs:string" minOccurs="0" maxOccurs="1" />
    <xs:element name="Description" type="xs:string" minOccurs="0" maxOccurs="1" />
```

TABLE 2-continued

```
    <xs:element name="Image" type="xs:string" minOccurs="0" maxOccurs="1" />
    <xs:element name="Enabled" type="xs:string" minOccurs="0" maxOccurs="1" />
    <xs:element name="Visible" type="xs:string" minOccurs="0" maxOccurs="1" />
    <xs:element name="Promoted" type="NavBoolType" minOccurs="0" maxOccurs="1" />
    <xs:element name="PromotedCategory" minOccurs="0" maxOccurs="1" />
     <xs:simpleType>
      <xs:restriction base="xs:string">
       <xs:enumeration value="New" />
       <xs:enumeration value="Process" />
       <xs:enumeration value="Report" />
      </xs:restriction>
     </xs:simpleType>
    </xs:element>
    <xs:element name="PromotedIsBig" type="NavBoolType" minOccurs="0" maxOccurs="1" />
    <xs:element name="Ellipsis" type="NavBoolType" minOccurs="0" maxOccurs="1" />
    <xs:element name="ShortCutKey" type="xs:string" minOccurs="0" maxOccurs="1" />
    <xs:element name="PushAction" minOccurs="0" maxOccurs="1">
     <xs:simpleType>
      <xs:restriction base="xs:string">
       <xs:enumeration value="OK" />
       <xs:enumeration value="Cancel" />
       <xs:enumeration value="LookupOK" />
       <xs:enumeration value="LookupCancel" />
       <xs:enumeration value="Yes" />
       <xs:enumeration value="No" />
       <xs:enumeration value="Close" />
       <xs:enumeration value="Stop" />
       <xs:enumeration value="FormHelp" />
       <xs:enumeration value="RunObject" />
       <xs:enumeration value="RunSystem" />
       <xs:enumeration value="LookupTable" />
      </xs:restriction>
     </xs:simpleType>
    </xs:element>
    <xs:element name="RunObject" type="xs:string" minOccurs="0" maxOccurs="1" />
    <xs:element name="RunFormView" type="xs:string" minOccurs="0" maxOccurs="1" />
    <xs:element name="RunFormLink" type="xs:string" minOccurs="0" maxOccurs="1" />
    <xs:element name="RunFormOnRec" type="NavBoolType" minOccurs="0" maxOccurs="1" />
    <xs:element name="RunFormMode" minOccurs="0" maxOccurs="1">
     <xs:simpleType>
      <xs:restriction base="xs:string">
       <xs:enumeration value="View" />
       <xs:enumeration value="Edit" />
       <xs:enumeration value="Create" />
      </xs:restriction>
     </xs:simpleType>
    </xs:element>
    <xs:element name="InFooterBar" type="NavBoolType" minOccurs="0" maxOccurs="1" />
    <xs:element name="OnAction" type="xs:string" minOccurs="0" maxOccurs="1" />
   </xs:all>
  </xs:complexType>
  <xs:complexType name="PageActionSeparatorType">
   <xs:all>
    <xs:element name="ID" type="xs:integer" maxOccurs="1" />
    <xs:element name="CaptionML" type="xs:string" minOccurs="0" maxOccurs="1" />
    <xs:element name="IsHeader" type="NavBoolType" minOccurs="0" maxOccurs="1" />
   </xs:all>
  </xs:complexType>
  <xs:complexType name="PageControlsType">
   <xs:all>
    <xs:element name="ContentArea" type="PageControlContainerType" minOccurs="0" maxOccurs="1" />
    <xs:element name="FactBoxArea" type="PageControlContainerType" minOccurs="0" maxOccurs="1" />
    <xs:element name="RoleCenterArea" type="PageControlContainerType" minOccurs="0" maxOccurs="1" />
    <xs:element name="DetailsArea" type="PageControlContainerType" minOccurs="0" maxOccurs="1" />
   </xs:all>
  </xs:complexType>
  <xs:complexType name="PageControlContainerType">
   <xs:sequence>
    <xs:element name="Properties" type="PageControlContainerPropertiesType" maxOccurs="1" />
    <xs:element name="ActionGroup" type="PageActionGroupType" minOccurs="0" maxOccurs="1" />
    <xs:choice minOccurs="0" maxOccurs="unbounded">
     <xs:element name="Group" type="PageControlGroupType" maxOccurs="1" />
     <xs:element name="Field" type="PageFieldType" maxOccurs="1" />
     <xs:element name="Part" type="PagePartType" maxOccurs="1" />
    </xs:choice>
   </xs:sequence>
  </xs:complexType>
  <xs:complexType name="PageControlContainerPropertiesType">
```

TABLE 2-continued

```xml
<xs:all>
  <xs:element name="ID" type="xs:integer" maxOccurs="1" />
  <xs:element name="Name" type="xs:string" minOccurs="0" maxOccurs="1" />
  <xs:element name="CaptionML" type="xs:string" minOccurs="0" maxOccurs="1" />
  <xs:element name="Description" type="xs:string" minOccurs="0" maxOccurs="1" />
</xs:all>
</xs:complexType>
<xs:complexType name="PageControlGroupType">
 <xs:sequence>
  <xs:element name="Properties" type="PageControlGroupPropertiesType" maxOccurs="1" />
  <xs:element name="ActionGroup" type="PageActionGroupType" minOccurs="0" maxOccurs="1" />
   <xs:choice minOccurs="0" maxOccurs="unbounded">
   <xs:element name="Action" type="PageActionType" maxOccurs="1" />
   <xs:element name="Group" type="PageControlGroupType" maxOccurs="1" />
   <xs:element name="Field" type="PageFieldType" maxOccurs="1" />
   <xs:element name="Part" type="PagePartType" maxOccurs="1" />
   </xs:choice>
 </xs:sequence>
</xs:complexType>
<xs:complexType name="PageControlGroupPropertiesType">
 <xs:all>
  <xs:element name="ID" type="xs:integer" maxOccurs="1" />
  <xs:element name="GroupType" minOccurs="0" maxOccurs="1">
   <xs:simpleType>
    <xs:restriction base="xs:string">
     <xs:enumeration value="Group" />
     <xs:enumeration value="Repeater" />
     <xs:enumeration value="CueGroup" />
     <xs:enumeration value="Report" />
     <xs:enumeration value="FixedLayout" />
    </xs:restriction>
   </xs:simpleType>
  </xs:element>
  <xs:element name="Name" type="xs:string" minOccurs="0" maxOccurs="1" />
  <xs:element name="CaptionML" type="xs:string" minOccurs="0" maxOccurs="1" />
  <xs:element name="Visible" type="xs:string" minOccurs="0" maxOccurs="1" />
  <xs:element name="Editable" type="xs:string" minOccurs="0" maxOccurs="1" />
  <xs:element name="Enabled" type="xs:string" minOccurs="0" maxOccurs="1" />
  <xs:element name="InstructionalTextML" type="xs:string" minOccurs="0" maxOccurs="1" />
  <xs:element name="Description" type="xs:string" minOccurs="0" maxOccurs="1" />
  <xs:element name="IndentationColumnName" type="xs:string" minOccurs="0" maxOccurs="1" />
  <xs:element name="IndentationControls" type="xs:string" minOccurs="0" maxOccurs="1" />
  <xs:element name="ShowAsTree" type="NavBoolType" minOccurs="0" maxOccurs="1" />
 </xs:all>
</xs:complexType>
<xs:complexType name="PageFieldType">
 <xs:sequence>
  <xs:element name="Properties" type="PageFieldPropertiesType" maxOccurs="1" />
  <xs:element name="Triggers" type="PageFieldTriggersType" minOccurs="0" maxOccurs="1" />
  <xs:element name="ActionGroup" type="PageActionGroupType" minOccurs="0" maxOccurs="1" />
 </xs:sequence>
</xs:complexType>
<xs:complexType name="PagePartType">
 <xs:sequence>
  <xs:element name="Properties" type="PagePartPropertiesType" maxOccurs="1" />
  <xs:element name="Triggers" type="PagePartTriggersType" minOccurs="0" maxOccurs="1" />
  <xs:element name="ActionGroup" type="PageActionGroupType" minOccurs="0" maxOccurs="1" />
 </xs:sequence>
</xs:complexType>
<xs:complexType name="PageFieldPropertiesType">
 <xs:all>
  <xs:element name="ID" type="xs:integer" maxOccurs="1" />
  <xs:element name="Name" type="xs:string" minOccurs="0" maxOccurs="1" />
  <xs:element name="Visible" type="xs:string" minOccurs="0" maxOccurs="1" />
  <xs:element name="Enabled" type="xs:string" minOccurs="0" maxOccurs="1" />
  <xs:element name="Editable" type="xs:string" minOccurs="0" maxOccurs="1" />
  <xs:element name="HideValue" type="xs:string" minOccurs="0" maxOccurs="1" />
  <xs:element name="CaptionML" type="xs:string" minOccurs="0" maxOccurs="1" />
  <xs:element name="MultiLine" type="NavBoolType" minOccurs="0" maxOccurs="1" />
  <xs:element name="ToolTipML" type="xs:string" minOccurs="0" maxOccurs="1" />
  <xs:element name="Description" type="xs:string" minOccurs="0" maxOccurs="1" />
  <xs:element name="OptionCaptionML" type="xs:string" minOccurs="0" maxOccurs="1" />
  <xs:element name="DecimalPlaces" type="xs:string" minOccurs="0" maxOccurs="1" />
  <xs:element name="Title" type="NavBoolType" minOccurs="0" maxOccurs="1" />
  <xs:element name="MinValue" type="xs:string" minOccurs="0" maxOccurs="1" />
  <xs:element name="MaxValue" type="xs:string" minOccurs="0" maxOccurs="1" />
  <xs:element name="NotBlank" type="NavBoolType" minOccurs="0" maxOccurs="1" />
  <xs:element name="CharAllowed" type="xs:string" minOccurs="0" maxOccurs="1" />
  <xs:element name="ValuesAllowed" type="xs:string" minOccurs="0" maxOccurs="1" />
  <xs:element name="BlankNumbers" minOccurs="0" maxOccurs="1">
```

TABLE 2-continued

```
   <xs:simpleType>
    <xs:restriction base="xs:string">
     <xs:enumeration value="DontBlank" />
     <xs:enumeration value="BlankNeg" />
     <xs:enumeration value="BlankNegAndZero" />
     <xs:enumeration value="BlankZero" />
     <xs:enumeration value="BlankZeroAndPos" />
     <xs:enumeration value="BlankPos" />
    </xs:restriction>
   </xs:simpleType>
  </xs:element>
  <xs:element name="BlankZero" type="NavBoolType" minOccurs="0" maxOccurs="1" />
  <xs:element name="AutoFormatType" type="xs:string" minOccurs="0" maxOccurs="1" />
  <xs:element name="AutoFormatExpr" type="xs:string" minOccurs="0" maxOccurs="1" />
  <xs:element name="Emphasized" type="xs:string" minOccurs="0" maxOccurs="1" />
  <xs:element name="SourceExpr" type="xs:string" minOccurs="0" maxOccurs="1" />
  <xs:element name="TableRelation" type="xs:string" minOccurs="0" maxOccurs="1" />
  <xs:element name="ShowAsRadioButton" type="NavBoolType" minOccurs="0" maxOccurs="1" />
  <xs:element name="EnabledIfRecUndef" type="NavBoolType" minOccurs="0" maxOccurs="1" />
  <xs:element name="EnabledIfError" type="NavBoolType" minOccurs="0" maxOccurs="1" />
  <xs:element name="EnabledIfSelection" type="NavBoolType" minOccurs="0" maxOccurs="1"/>
  <xs:element name="Importance" minOccurs="0" maxOccurs="1">
   <xs:simpleType>
    <xs:restriction base="xs:string">
     <xs:enumeration value="Standard" />
     <xs:enumeration value="Promoted" />
     <xs:enumeration value="Additional" />
    </xs:restriction>
   </xs:simpleType>
  </xs:element>
  <xs:element name="ExtendedDataType" minOccurs="0" maxOccurs="1">
   <xs:simpleType>
    <xs:restriction base="xs:string">
     <xs:enumeration value="Phone No." />
     <xs:enumeration value="URL" />
     <xs:enumeration value="E-Mail" />
     <xs:enumeration value="Ratio" />
    </xs:restriction>
   </xs:simpleType>
  </xs:element>
  <xs:element name="LayoutOptions" type="xs:string" minOccurs="0" maxOccurs="1" />
  <xs:element name="CaptionClass" type="xs:string" minOccurs="0" maxOccurs="1" />
  <xs:element name="SkipOnTab" type="NavBoolType" minOccurs="0" maxOccurs="1" />
  <xs:element name="DrillDownFormID" type="xs:string" minOccurs="0" maxOccurs="1" />
  <xs:element name="LookupFormID" type="xs:string" minOccurs="0" maxOccurs="1" />
  <xs:element name="Lookup" type="NavBoolType" minOccurs="0" maxOccurs="1" />
  <xs:element name="DrillDown" type="NavBoolType" minOccurs="0" maxOccurs="1" />
  <xs:element name="AssistEdit" type="NavBoolType" minOccurs="0" maxOccurs="1" />
  <xs:element name="ClosingDates" type="NavBoolType" minOccurs="0" maxOccurs="1" />
  <xs:element name="Numeric" type="NavBoolType" minOccurs="0" maxOccurs="1" />
  <xs:element name="DateFormula" type="NavBoolType" minOccurs="0" maxOccurs="1" />
 <xs:all>
</xs:complexType>
<xs:complexType name="PagePartPropertiesType">
 <xs:all>
  <xs:element name="ID" type="xs:integer" maxOccurs="1" />
  <xs:element name="Name" type="xs:string" minOccurs="0" maxOccurs="1" />
  <xs:element name="Visible" type="xs:string" minOccurs="0" maxOccurs="1" />
  <xs:element name="Enabled" type="xs:string" minOccurs="0" maxOccurs="1" />
  <xs:element name="Editable" type="xs:string" minOccurs="0" maxOccurs="1" />
  <xs:element name="CaptionML" type="xs:string" minOccurs="0" maxOccurs="1" />
  <xs:element name="ToolTipML" type="xs:string" minOccurs="0" maxOccurs="1" />
  <xs:element name="Description" type="xs:string" minOccurs="0" maxOccurs="1" />
  <xs:element name="PartType" minOccurs="0" maxOccurs="1">
   <xs:simpleType>
    <xs:restriction base="xs:string">
     <xs:enumeration value="Page" />
     <xs:enumeration value="System" />
     <xs:enumeration value="Chart" />
    </xs:restriction>
   </xs:simpleType>
  </xs:element>
  <xs:element name="PagePartID" type="xs:string" minOccurs="0" maxOccurs="1" />
  <xs:element name="SystemPartID" minOccurs="0" maxOccurs="1">
   <xs:simpleType>
    <xs:restriction base="xs:string">
     <xs:enumeration value="Outlook" />
     <xs:enumeration value="Notes" />
     <xs:enumeration value="MyNotes" />
     <xs:enumeration value="RecordLinks" />
```

TABLE 2-continued

```
    </xs:restriction>
   </xs:simpleType>
  </xs:element>
  <xs:element name="ChartPartID" type="xs:string" minOccurs="0" maxOccurs="1" />
  <xs:element name="SubFormView" type="xs:string" minOccurs="0" maxOccurs="1" />
  <xs:element name="SubFormLink" type="xs:string minOccurs="0" maxOccurs="1" />
  <xs:element name="ProviderId" type="xs:integer" minOccurs="0" maxOccurs="1" />
 </xs:all>
</xs:complexType>
<xs:complexType name="PageFieldTriggersType">
 <xs:all>
  <xs:element name="OnValidate" type="xs:string" minOccurs="0" maxOccurs="1" />
  <xs:element name="OnLookup" type="xs:string" minOccurs="0" maxOccurs="1" />
  <xs:element name="OnDrillDown" type="xs:string" minOccurs="0" maxOccurs="1" />
  <xs:element name="OnAssistEdit" type="xs:string" minOccurs="0" maxOccurs="1" />
 </xs:all>
</xs:complexType>
<xs:complexType name="PagePartTriggersType">
 <xs:all>
  <xs:element name="OnValidate" type="xs:string" minOccurs="0" maxOccurs="1" />
  <xs:element name="OnLookup" type="xs:string" minOccurs="0" maxOccurs="1" />
  <xs:element name="OnDrillDown" type="xs:string" minOccurs="0" maxOccurs="1" />
  <xs:element name="OnAssistEdit" type="xs:string" minOccurs="0" maxOccurs="1" />
 </xs:all>
</xs:complexType>
</xs:schema>
```

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the transformation system may redefine shortcut keys defined by a form so that they do not conflict with shortcut keys defined by the pages version of the application. Accordingly, the invention is not limited except as by the appended claims.

We claim:

1. A method in a computing device for transforming forms defining a user interface of a first version of an application to pages defining the user interface of a second version of the application, the forms specifying both a logical and a physical layout of the user interface, the pages specifying a logical layout of the user interface, the method comprising:
   providing the forms in an XML format that define a user interface, the XML format being in compliance with a form schema;
   providing code rules defining a transformation of code of forms to code of pages, wherein each of the code rules specifies a code pattern of a form that includes location information specifying location of an element on the form and replacement code of a page that omits location information that specifies location of the element of the form;
   providing a control input defining forms of the provided forms to be transformed and modifications to the defined forms;
   receiving customizations to the control input, the customizations indicating transformations that are specific to the defined forms; and
   transforming the defined forms to pages by
      applying the code rules to the defined forms to replace the code patterns within the defined forms with the replacement code of the pages to generate pages specifying a logical layout but not a physical layout of the user interface; and
      modifying the defined forms in accordance with the control input as customized wherein the transformed forms are pages in an XML format in compliance with a page schema for defining a logical layout but not a physical layout of a user interface.

2. The method of claim 1 wherein the control input includes an indication of which of the provided forms are to be transformed.

3. The method of claim 1 wherein the transforming further includes applying modifications to the defined forms that are common transformations applied to forms.

4. The method of claim 3 wherein the common transformations are hard-coded in a transformation system provided by a developer of the application.

5. The method of claim 1 wherein the pages include triggers specifying conditions on which certain code is to be performed and the code rules specify transformations to pages for each type of trigger.

6. The method of claim 1 wherein the providing of the forms includes exporting forms of the first version of the application into the XML format.

7. The method of claim 1 including importing the pages in the XML format into the second version of the application.

8. The method of claim 7 including displaying by the second version of the application the imported pages.

9. The method of claim 1 wherein the application is an enterprise resource planning application.

10. A computer-readable storage medium for controlling a computing device to transform forms defining a user interface of a first version of an application to pages defining the user interface of a second version of the application, the forms specifying both a logical and a physical layout of the user interface, the pages specifying a logical layout of the user interface, by a method comprising:
   providing the forms in an XML format that define a user interface developed by an organization, the XML format being in compliance with a form schema;
   providing code rules defining a transformation of code of forms to code of pages, wherein each of the code rules specifies a code pattern of a form that includes location information specifying location of an element on the form and replacement code of a page that omits location information that specifies location of the element of the form, a code pattern specifying a trigger that indicates conditions on which certain code is to be performed and the code rules specifying transformations to pages for each type of trigger;

providing a control input defining forms of the provided forms to be transformed and modifications to the defined forms;

receiving from a user customizations to the control input, the customizations indicating transformations that are specific to the defined forms; and transforming the defined forms to pages by
- applying the code rules to the XML format of the defined forms to replace code patterns within the defined forms with the replacement code of pages to generate pages specifying a logical layout but not a physical layout of the user interface; and
- modifying the defined forms in accordance with the control input as customized by the user wherein the transformed forms are pages in an XML format in compliance with a page schema.

11. The computer-readable storage medium of claim 10 wherein the control input includes an indication of which defined forms are to be transformed.

12. The computer-readable storage medium of claim 10 wherein the transforming further includes applying modifications to the defined forms that are common transformations applied to any form.

13. The computer-readable storage medium of claim 12 wherein the common transformations are hard-coded in a transformation system provided by a developer of the application.

14. The computer-readable storage medium of claim 10 wherein the providing of the forms includes exporting forms of the first version of the application into the XML format and includes importing the pages in the XML format into the second version of the application.

15. A computing device for transforming forms defining a user interface of a first version of an application to pages defining the user interface of a second version of the application, the forms specifying both a logical and a physical layout of the user interface, the pages specifying a logical layout of the user interface, comprising:

a memory storing:
- the forms in an XML forms format that define a user interface;
- code rules defining a transformation of code of forms to code of pages, wherein each of the code rules specifies a code pattern of a form that includes location information specifying location of an element on the form and replacement code of a page that omits location information that specifies location of the element of the form;
- configuration data defining modifications to the forms in the XML forms format; and
- computer-executable instructions of:
  - a transformation component that transforms the forms in the XML forms format to pages in an XML pages format in accordance with the code rules and the configuration data by applying the code rules to the forms in the XML forms format to replace the code patterns within the forms in the XML forms format with the replacement code of the pages in the XML pages format to generate pages specifying a logical layout but not a physical layout of the user interface; and
  - a component that imports the pages in the XML pages format resulting from the transformation into the second version of the application; and a processor that executes the computer-executable instructions stored in the memory.

16. The computing device of claim 15 wherein the configuration data includes an indication of which forms are to be transformed.

17. The computing device of claim 16 wherein the transformation component includes applying modifications to the forms that are common transformations applied to forms of any customer of the application.

18. The computing device of claim 16 wherein the pages include triggers specifying conditions on which certain code is to be performed and the code rules specify transformations to pages for each type of trigger.

19. The computing device of claim 16 wherein the forms are in compliance with an XML forms schema and the pages are in compliance with an XML pages schema.

20. The computing device of claim 16 wherein the transforming includes applying transforms that are common to all forms.

* * * * *